(12) United States Patent
Harnik et al.

(10) Patent No.: US 10,198,455 B2
(45) Date of Patent: *Feb. 5, 2019

(54) SAMPLING-BASED DEDUPLICATION ESTIMATION

(71) Applicant: INTERNATIONAL BUSINESS MACHINES CORPORATION, Armonk, NY (US)

(72) Inventors: Danny Harnik, Tel Mond (IL); David Chambliss, Morgan Hill, CA (US); Oded Margalit, Ramat-Gan (IL); Dmitry Sotnikov, Rishon-Lezion (IL)

(73) Assignee: International Business Machines Corporation, Armonk, NY (US)

( * ) Notice: Subject to any disclaimer, the term of this patent is extended or adjusted under 35 U.S.C. 154(b) by 337 days.

This patent is subject to a terminal disclaimer.

(21) Appl. No.: 14/994,161

(22) Filed: Jan. 13, 2016

(65) Prior Publication Data
US 2017/0199895 A1 Jul. 13, 2017

(51) Int. Cl.
G06F 17/30 (2006.01)

(52) U.S. Cl.
CPC .. *G06F 17/30159* (2013.01); *G06F 17/30097* (2013.01)

(58) Field of Classification Search
None
See application file for complete search history.

(56) References Cited

U.S. PATENT DOCUMENTS

| | | | |
|---|---|---|---|
| 8,615,499 B2 | 12/2013 | Chambliss et al. | |
| 8,650,163 B1 | 2/2014 | Harnik et al. | |
| 8,793,226 B1 | 7/2014 | Yadav et al. | |
| 9,152,333 B1 | 10/2015 | Johnston et al. | |
| 9,244,976 B1* | 1/2016 | Zhang | G06F 17/30442 |
| 2003/0182310 A1* | 9/2003 | Charnock | G06F 17/30716 |

(Continued)

FOREIGN PATENT DOCUMENTS

WO 2007127360 11/2007

OTHER PUBLICATIONS

Danny Harnik et al., "Estimation of deduplication ratios in large data sets", Mass Storage Systems and Technologies (MSST), 2012 IEEE 28th Symposium on, Year: 2012, pp. 1-11.

(Continued)

*Primary Examiner* — Wilson Lee
(74) *Attorney, Agent, or Firm* — Daniel Kligler

(57) ABSTRACT

A method, including partitioning a dataset into a first number of data units, and selecting, based on a sampling ratio, a second number of the data units. A hash value is calculated for each of the selected data units, and a first histogram is computed indicating a first duplication count for each of the calculated hash values. Based on respective frequencies of the calculated hash values, a second histogram is computed indicating an observed frequency for each of the first duplication counts in the first histogram, and based on the sampling ratio and the second histogram, a target function is derived. A third histogram that minimizes the target function is derived, the third histogram including, for the first number of the storage units, second duplication counts and a respective predicted frequency for each of the second duplication counts. Finally, a deduplication ratio is determined based on the third histogram.

21 Claims, 2 Drawing Sheets

(56) References Cited

U.S. PATENT DOCUMENTS

| | | | | |
|---|---|---|---|---|
| 2004/0059743 | A1* | 3/2004 | Burger | G06F 17/30536 |
| 2010/0088315 | A1* | 4/2010 | Netz | G06F 17/30501 |
| | | | | 707/737 |
| 2014/0244604 | A1 | 8/2014 | Oltean et al. | |
| 2014/0304239 | A1 | 10/2014 | Lewis et al. | |
| 2015/0010143 | A1* | 1/2015 | Yang | G09C 1/00 |
| | | | | 380/28 |

OTHER PUBLICATIONS

Yuanjian Xing et al., "PeerDedupe: Insights into the Peer-Assisted Sampling Deduplication", Peer-to-Peer Computing (P2P), 2010 IEEE Tenth International Conference on Date of Conference: Aug. 25-27, 2010. pp. 1-10.

Fei Xie et al., "Estimating duplication by content-based sampling", 2013 USENIX Annual Technical Conference, pp. 181-186.

* cited by examiner

SAMPLING-BASED DEDUPLICATION ESTIMATION

CROSS-REFERENCE TO RELATED APPLICATIONS

This application is related to U.S. Patent Applications titled "Low Memory Sampling Based Estimation of Distinct Elements and Deduplication" and "Gauging Accuracy of Sampling-Based Distinct Element Estimation" filed on even date with the present application, and which are incorporated herein by reference.

FIELD OF THE INVENTION

The present invention relates generally to data deduplication, and specifically to implementing a method of estimating a deduplication ratio based on a random sample of data retrieved from a dataset.

BACKGROUND

In datasets typically stored on storage systems, data deduplication is a technique for eliminating duplicate copies of repeating data, thereby improving storage utilization. Additionally, in data network environments, data deduplication can be applied to network data transfers in order to reduce the amount of data to be transmitted over the network. In a data deduplication process, unique chunks of data (i.e., byte patterns) are identified and stored during a process of analysis. As the analysis continues, other chunks are compared to the stored copy and whenever a match occurs, the redundant chunk is replaced with a small reference that points to the stored chunk. Given that the same byte pattern may occur dozens, hundreds, or even thousands of times (the match frequency is dependent on the chunk size), the amount of data that must be stored or transferred can be greatly reduced.

The potential savings that deduplication can yield are profound. For example, in workloads that have inherent repetitions (e.g., backup scenarios), deduplication can reduce required storage with ratios ranging between 1:2 and 1:50.

The description above is presented as a general overview of related art in this field and should not be construed as an admission that any of the information it contains constitutes prior art against the present patent application.

SUMMARY

There is provided, in accordance with an embodiment of the present invention a method, including partitioning a dataset into a first number of logical data units, selecting, based on a sampling ratio, a second number of the logical data units, the second number of the logical data units including a random sample of the first number of logical data units, calculating a hash value for each of the selected logical data units, computing a first histogram indicating a first duplication count for each of the calculated hash values, computing, based on respective frequencies of the calculated hash values, a second histogram indicating an observed frequency for each of the first duplication counts in the first histogram, deriving, based on the sampling ratio and the second histogram, a target function, deriving a third histogram that minimizes the target function, the third histogram including, for the first number of the storage units, second duplication counts and a respective predicted frequency for each of the second duplication counts, and determining, based on the third histogram, a deduplication ratio.

There is also provided, in accordance with an embodiment of the present invention an apparatus, including a storage device configured to store a dataset, and a processor configured to partition a dataset into a first number of logical data units, to select, based on a sampling ratio, a second number of the logical data units, the second number of the logical data units including a random sample of the first number of logical data units, to calculate a hash value for each of the selected logical data units, to compute a first histogram indicating a first duplication count for each of the calculated hash values, to compute, based on respective frequencies of the calculated hash values, a second histogram indicating an observed frequency for each of the first duplication counts in the first histogram, to derive, based on the sampling ratio and the second histogram, a target function, to derive a third histogram that minimizes the target function, the third histogram including, for the first number of the storage units, second duplication counts and a respective predicted frequency for each of the second duplication counts, and to determine, based on the third histogram, a deduplication ratio.

There is further provided, in accordance with an embodiment of the present invention a computer program product, the computer program product including a non-transitory computer readable storage medium having computer readable program code embodied therewith, the computer readable program code including computer readable program code configured to partition a dataset into a first number of logical data units, computer readable program code configured to select, based on a sampling ratio, a second number of the logical data units, the second number of the logical data units including a random sample of the first number of logical data units, computer readable program code configured to calculate a hash value for each of the selected logical data units, computer readable program code configured to compute a first histogram indicating a first duplication count for each of the calculated hash values, computer readable program code configured to compute, based on respective frequencies of the calculated hash values, a second histogram indicating an observed frequency for each of the first duplication counts in the first histogram, computer readable program code configured to derive, based on the sampling ratio and the second histogram, a target function, computer readable program code configured to derive a third histogram that minimizes the target function, the third histogram including, for the first number of the storage units, second duplication counts and a respective predicted frequency for each of the second duplication counts, and computer readable program code configured to determine, based on the third histogram, a deduplication ratio.

BRIEF DESCRIPTION OF THE DRAWINGS

The disclosure is herein described, by way of example only, with reference to the accompanying drawings, wherein.

DETAILED DESCRIPTION OF EMBODIMENTS

Figure 1:
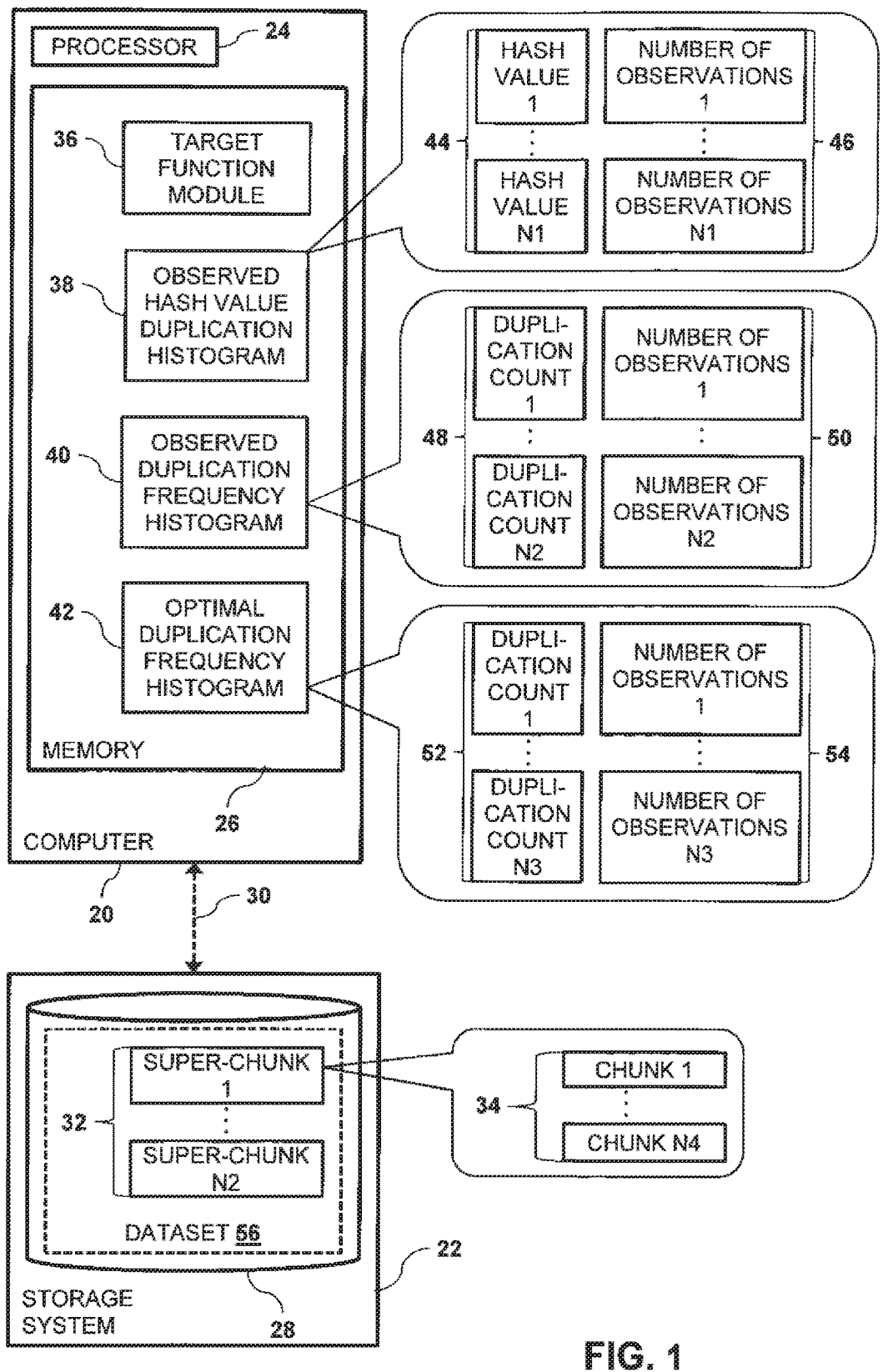
FIG. 1 is a block diagram that schematically illustrates a computer system configured to use a sampling-based deduplication estimation method, in accordance with an embodiment of the present invention.

When implementing data deduplication, an entire dataset on a storage system is typically processed in order to realize the maximum saving potential of the deduplication. While the same process may be replicated in order to estimate the deduplication ratio of the dataset, processing the entire dataset can be a prohibitively expensive operation that requires large memory and computing resources. On the other hand, estimating deduplication savings by examining a sample of the data can be challenging, since data deduplication is a global property, and repetitions need to be identified over ranges that may span multiple terabytes of data in multiple locations.

Embodiments of the present invention provide methods and systems that provide a framework for the task of estimating a deduplication ratio based on a sample of the dataset. As described hereinbelow, a dataset is partitioned into a first number of logical data units, and, based on a sampling ratio, a second number of the logical data units are selected, the second number of the logical data units comprising a random sample of the first number of logical data units. A hash value is calculated for each of the selected logical data units, and a first histogram indicating a first duplication count for each of the calculated hash values is computed. Upon computing, based on respective frequencies of the calculated hash values, a second histogram indicating an observed frequency for each of the first duplication counts in the first histogram, a target function is derived based on the sampling ratio and the second histogram. A third histogram that minimizes the target function is computed, the third histogram comprising, for the first number of the storage units, second duplication counts and a respective predicted frequency for each of the second duplication counts, and the third histogram is used to determine a deduplication ratio.

In some embodiments, compression ratios of the second number of logical data units can be incorporated into the data duplication analysis, thereby enabling estimation of the combined compression and deduplication savings in systems that employ both technologies.

In operation, the target function measures a distance between a "sampling transformation" on potential third histograms and the second observed histogram. The goal is to find the third histogram that minimizes the distance. The third histogram having the minimum distance comprises an "optimal histogram", and to derive, from this optimal histogram, an estimation of the deduplication potential in the dataset. Finding the optimal histogram can be performed using various standard optimization methods, depending also on the distance measure at hand.

Embodiments of the present invention provide a capability to forecast how much space can be saved from deduplicating a specific dataset. Motivations for forecasting the space savings include:

Storage system sizing. When purchasing a storage system with deduplication, a sufficient amount of storage space needs to be purchased to store all of the data (i.e., after deduplication). This amount of storage space can vary greatly according to the deduplication ratio. Therefore, assuming an aggressive deduplication ratio (expecting too high savings from deduplication) can leave the system out of space at some point. On the other hand taking a very cautious approach (assuming poor deduplication benefits) to the deduplication ratio may result in excess capital expenditures which negates the purpose of using deduplication in the first place. Therefore, an accurate estimation of the space saving is paramount to the success of a deduplication system.

Resource allocation and decisions. Performing deduplication comes at a cost of system resources. Central processing unit (CPU), memory and disk resources are typically used to carry out the deduplication process. These resources may be scarce in storage or other systems and therefore should be allocated carefully. Specifically, resources can be allocated to data with the best savings potential (i.e., as opposed wasting these resources on data that has no meaningful deduplication potential). In other words, embodiments of the present invention enable capital resources to be directed to storage systems that support deduplication only for storage systems whose data exhibits sufficient deduplication saving potential.

Choice of algorithm. Different deduplication methods (e.g. chunking methods and chunk size) can at times produce different results. Knowing an optimal method for determining deduplication levels in advance can prove to be highly beneficial.

System Description

FIG. 1 is a block diagram that schematically illustrates a computer 20 configured to estimate a deduplication ratio for a dataset 56 stored on a storage system 22 in accordance with an embodiment of the present invention. Computer 20 comprises a processor 24 and a memory 26, and storage system 22 comprises one or more storage devices 28 such as hard disk drives or solid-state disk drives. Computer 20 and storage system 22 communicate via a data network connection 30.

In embodiments described herein, the dataset is partitioned into logical data units comprising super-chunks 32, each of the super-chunks comprising multiple chunks 34. For example, each super-chunk 32 may comprises a logical data unit having a length of one megabyte, and each chunk 34 may comprise a logical data unit having a length of 64 kilobytes. In this example, each super-chunk 32 comprises sixteen chunks 34. While chunks 34 are typically fixed lengths, chunks 34 having variable lengths is considered to be within the spirit and scope of the present invention.

While the configuration in FIG. 1 presents the logical data units comprising super-chunks 32 and chunks 34, dataset 56 comprising any type of logical data units that can be analyzed for deduplication is considered to be within the spirit and scope of the present invention. Examples of logical data units that computer 20 can analyzed for deduplication include block logical data units, file system logical data units and object logical data units. It is understood that this logical composition (i.e., super-chunks 32 and chunks 34) is for the sake of performing or estimating deduplication on this data and does not necessarily apply to the data in other circumstances.

Memory 26 stores a target function module 36, an observed hash value duplication histogram 38, an observed duplication frequency histogram 40 and a derived optimal duplication frequency histogram 42. In embodiments described herein, each histogram 36, 38 and 39 comprises (i.e., in a more general mathematical sense) a function $m_i$ that counts the number of observations that fall into each of the disjoint categories (known as bins). Therefore, if we let n be the total number of observations and k be the total number of bins, the histogram $m_i$ meets the following conditions:

$$n = \sum_{i=1}^{k} m_i. \qquad (1)$$

In embodiments described herein, observed hash value duplication histogram 38 may also be referred to as a first histogram, observed duplication frequency histogram 40 may also be referred to as a second histogram and derived optimal duplication frequency histogram may also be referred to as a third histogram. As described hereinbelow:

Processor 24 first retrieves a sample number of chunks 34, calculates a hash value 44 for each of the chunks, and creates observed hash value duplication histogram 38. In observed hash value duplication histogram 38, each given hash value 44 has an associated number of observations 46 indicating a number of chunks 34 that have the given hash value.

Processor 24 analyzes observed hash value duplication histogram 38 to create observed duplication frequency histogram 40 comprising duplication counts 48 and corresponding number of observations 50. Each duplication count 48 indicates a number of duplications (i.e., observed frequency histogram 40 comprises observed frequencies of duplication counts 48). For example, a given duplication count 48 stores "5" and its corresponding number of observations 52 stores "8" indicates that there are eight instances in the sample number of chunks 34 where a given chunk 34 is duplicated five times.

Processor 24 executes target function module 36 to derive a target function comprising a transformation function.

Processor 24 derives third histogram 42 comprising duplication counts 52 and a corresponding number of observations 54. In embodiments of the present invention, derived duplication frequency histogram 42 comprises a duplication frequency histogram for all chunks 34 in dataset 56 that "best explains" observed frequency histogram 40.

While embodiments herein use hash values 44 to identify duplicate chunks 34, any other type of digital "fingerprint" that can identify the duplicate chunks is considered to be within the spirit and scope of the present invention. In some embodiments, each given hash value 44 may have a corresponding compression ratio (not shown) or an estimated compression ratio (not shown) for the chunk associated with the given hash value. Incorporating compression ratios or estimated compression ratios into identifying space savings realized from deduplication is described hereinbelow.

Memory 26 typically comprises high-speed volatile memory such as random access memory (RAM). While the example in FIG. 1 shows histograms 38, 40 and 42 stored entirely in memory 26, other configurations are considered to be within the spirit and scope of the present invention. For example, histograms 38, 40 and 42 can be stored on storage device (not shown) coupled to computer 20, or the histograms can stored using a combination of memory 26 and the storage device.

Processor 24 typically comprises a general-purpose computer, which are programmed in software to carry out the functions described herein. The software may be downloaded to computer 20 in electronic form, over a network, for example, or it may be provided on non-transitory tangible media, such as optical, magnetic or electronic memory media. Alternatively, some or all of the functions of processor 24 may be carried out by dedicated or programmable digital hardware components, or using a combination of hardware and software elements.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Deduplication Ratio Estimation

Figure 2:
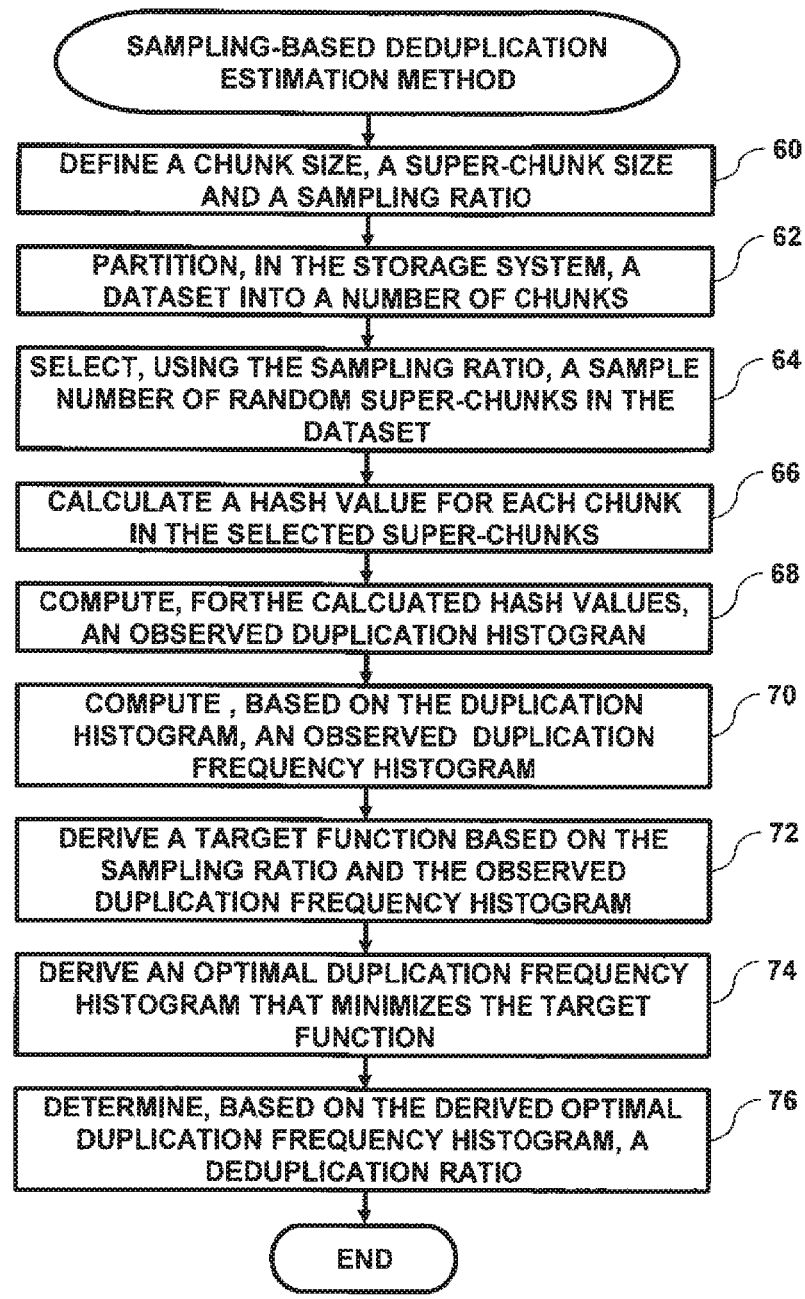
FIG. 2 is a flow diagram that schematically illustrates a method for sampling-based deduplication estimation, in accordance with an embodiment of the present invention.

FIG. 2 is a flow diagram that schematically illustrates a method for estimating a deduplication ratio in dataset 56, in accordance with an embodiment of the present invention. In a definition step 60, a chunk size, a super-chunk size and a sampling ratio are defined, and in an partition step 62, processor 24 partitions dataset 56 into a number (also referred to herein as a first number of chunks 34.

In a selection step 64, processor 24 selects, using the sampling ratio, a sample number (also referred to herein as a second number) of random chunks 34 in dataset 56. Using a simple example, if the chunk size is 1,000 bytes, the sampling ratio is 10%, and there are 100,000 chunks 34 in dataset 56, then processor 24 selects a random sample of 10,000 chunks 34.

In some embodiments (especially in hard disk based storage systems), processor 24 can reduce the time required to retrieve the selected random chunks 34 by retrieving super-chunks 32 from storage system 22, each of the super-chunks comprising multiple chunks 34. For example, if the super-chunk size is 10,000 bytes, then processor 24 can retrieve 1,000 random super-chunks 32, and extract 10,000 chunks 34 from the retrieved super-chunks (i.e., extract ten chunks 34 from each super-chunk 32).

In a calculation step 66, processor 24 calculates a given hash value 44 for each chunk 34, and in a first computation step 68, the processor computes observed hash value duplication histogram 38. Observed hash value duplication histogram 38 comprises hash values 44 calculated in step 66 and number of observations 46 indicating a respective number of duplications of data stored in chunks 34.

In a second computation step 70, processor 24 uses observed hash value duplication histogram 38 to compute observed duplication frequency histogram 40. Duplication counts 48 and number of observations 50 in observed frequency histogram 40 comprises a histogram of how many chunks 34 are duplicated one time, how many chunks 34 are duplicated two times, how many chunks 34 are duplicated three times etc. In embodiments described herein, observed hash value duplication histogram 38 may incorporate factors such as length types (i.e., whether the logical data units have fixed or variable lengths), physical locations, virtual locations and timestamps. For example, if processor 24 calculates identical hash values 44 for two chunks (i.e., logical data units) that have different timestamps, the processor can store the two (i.e., identical) hash values to separate entries in observed has value duplication histogram 38.

In a first derivation step 72, processor 24 executes target function module 36 to define a target function based on the sampling ratio and observed duplication frequency histogram 40, and in a second derivation step 74, the processor derives an optimal duplication frequency histogram 42 that minimizes target function module 36. When deriving histogram 42, processor 24 can use calculations such as quadratic programming computations, maximum likelihood computations and linear programming computations. Calculations used by embodiments of the present invention to perform steps 72-74 are described hereinbelow.

Finally, in a determination step 78, processor 24 determines a deduplication ratio based on the identified optimal histogram in a determination step 78, and the method ends. In some embodiments, the deduplication ratio indicates a first space savings for implementing deduplication on the sample number of chunks 34. In additional embodiments, processor 24 can estimate a compression ratio for each of the sample chunks, and can determine a second space savings based on the compression ratios and the deduplication ratio.

In further embodiments, processor 24 can (i.e., in step 68) compute observed hash value duplication histogram 38 for a subset of the hash values calculated in step 66. In other words, observed hash value duplication histogram 38 indicates duplication counts for a subset of the calculated hash values. In these further embodiments, processor 24 can compute derived duplication frequency histogram 40 and estimate the deduplication ratio based on hash value duplication histogram 38 that was computed for the subset of the hash values.

Target Function Definition

In embodiments of the present invention, a dataset is comprises collection of items. In reality, the data is a stream of bytes, that for the purposes of deduplication is broken into data chunks 34 (this could be fixed or variable sized chunks, e.g. of size 4K) and a given hash value 44 (i.e., a digital fingerprint) is computed for each chunk 34. In some embodiments, the collection of these fingerprints is considered to be the items in the dataset, where duplication of two items means that the corresponding chunks had identical fingerprints. Each of the items may also hold a compression ratio (or estimated compression ratio) for the corresponding data chunk.

In operation, processor 24 takes a random sample of size m out of the entire dataset of size N, and computes a duplication frequency histogram y (i.e., observed duplication frequency histogram 40) on this sample. Processor 24 then defines the sampling transform T (i.e., via target function module 36) between a duplication frequency histogram x' (not shown) on a dataset of total size N to the expected duplication frequency histogram y' (not shown) of a random sample of size m (randomly chosen out of the full sized N dataset).

The goal of the method is to find a legal duplication frequency histogram x' such that the distance between T(x') and the observed y is minimal. In embodiments described herein, this distance comprises the target function. The deduplication estimation of the dataset can then be computed according to the optimal x' (i.e., derived duplication frequency histogram 42).

More formally, given an observed duplication frequency histogram y, the goal is to find a legal duplication frequency histogram x' for which $$\sum_{i=1}^{size(x')} i * x'_i = N \qquad (2)$$

that minimizes the distance (i.e., the target function):

$$Dist(T(x'),y) \qquad (3)$$

The estimated number of distinct chunks in the entire dataset is then $$C = \sum_{i=1}^{size(x')} x'_i \qquad (4)$$

and the estimated deduplication ratio is $$R = \frac{C}{N}.$$

Finding the optimal x can be done in various optimization methods, for example, using linear programming when the distance measure is an $l_1$ norm, using quadratic programming when the distance is measure is an $l_2$ norm or using a choice of optimization methods to find a maximum likelihood ratio.

There are several variations to be considered here that are specific to the case of data reduction and deduplication:

In storage systems that are the main target of deduplication estimation, performing random sampling at a low granularity is taxing. Instead, one implementation is to sample "super-chunks" 32 that match the underlying page size of the storage system (this could be 256 KB, 1 MB depending on system). Each super-chunk 32 can then be broken into the smaller deduplication chunks 34 and considered part of the sample. While this does not constitute of a truly random sample, experiments have shown that this forms a fair estimation.

Another implementation can sample super-chunks 32, and then break them into smaller chunks 34 for a variety of chunk sizes and methods. For each chunking method the estimation process can be run separately, and this can give an indication of the best "chunking" method for the dataset at hand.

In the case that compression is also implemented in the system (this is a popular and beneficial combination where typically compression is performed after deduplication), the algorithm in target function module 36 can be modified as follows: Hold a weighted duplication frequency histogram in which the $i^{th}$ bucket contains the number of element that had i duplications times $CR_i$, where $CR_i$ is the average compression ratio of the elements (i.e., chunks 34) with duplication i. In other words, the $i^{th}$ bucket represents the average number of chunks required to store all of the items that had reference count i (after they are compressed). Let CR be the average compression of the non deduplicated data—this can be efficiently estimated using sampling techniques known in the art. The optimization will now be the following:

Find a weighted duplication frequency histogram x' under the constraint that $$\sum_{i=1}^{size(x)} i * x_i = N \cdot CR \qquad (5)$$

such that the distance between T(x') and the observed weighted duplication frequency histogram y is minimal.

The estimated number of chunks required to store the entire compressed and deduplicated dataset is then $$C = \sum_{i=1}^{size(x')} x'_i \qquad (6)$$

and the estimated data reduction ratio is $$R = \frac{C}{N}.$$

In a straightforward implementation, processor 24 generates the duplication frequency histogram directly from the sampled data. However, some deduplication techniques are limited in their duplication finding and elimination capabilities. For example, it may be the case that deduplication is only performed when the physical/virtual addresses (i.e., locations) involved are close or in the same range. Such considerations can be inserted in the creation of the duplication frequency histogram, so that it reflects what would happen when the actual deduplication algorithm runs.

In another implementation, the sample used to form the observed y is taken on-line, by a bump in the wire that records hashes for p percent of the traffic. In such an implementation, duplications that occur at large time distances from each other can be treated differently, depending on the deduplication architecture at hand. In some embodiments, processor 24 can determine the time distances based on timestamps of the logical data units (e.g., super-chunks 32 and chunks 34)

In embodiments where compression ratios are incorporated into the estimation, processor 24 can associate each of duplication count 48 in observed frequency distribution 40 with one or more of the logical data units, and then calculate, for each given deduplication count 48, an average of the compression ratios of the logical data units associated with the given deduplication count, weight, for each of deduplication count 48, the respective observed frequency (i.e., observations 50) according to the respective average compression ratios, and weight the optimal duplication frequency histogram 42 based on the average of the compression ratios.

The flowchart(s) and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

It will be appreciated that the embodiments described above are cited by way of example, and that the present invention is not limited to what has been particularly shown and described hereinabove. Rather, the scope of the present invention includes both combinations and subcombinations of the various features described hereinabove, as well as variations and modifications thereof which would occur to persons skilled in the art upon reading the foregoing description and which are not disclosed in the prior art.

The invention claimed is:

1. A method for determining a deduplication rate of logical data units in a dataset, comprising:
    randomly selecting, from a dataset partitioned into a first number of logical data units, a second number of logical data units determined by a sampling ratio, to be included in a sample group;
    calculating, by a processor, respective hash values for each of the selected logical data units;
    computing a first histogram indicating a duplication count of logical data units in the sample group, using the calculated hash values;
    computing, based on respective frequencies of the calculated hash values, a second histogram indicating respective frequencies of the duplication counts in the first histogram;
    deriving a third histogram of predicted respective frequencies of duplication counts in the set of logical data units, by performing an optimization method, with a target function that minimizes a distance between the second histogram and the result of applying a sampling transformation with the specified sampling ratio on candidate third histograms; and
    determining, based on the third histogram, a deduplication ratio for the dataset.

2. The method according to claim 1, wherein the logical data units comprise first logical data units having a first length, and wherein selecting the second number of the first logical data units comprises selecting a third number of second logical data units from the dataset, the second logical data units having a second length greater than the first length, and extracting, from the retrieved second logical data units, the second number of the first logical data units.

3. The method according to claim 1, wherein the deduplication ratio indicates a first space savings for implementing deduplication on the logical storage units, and comprising estimating a compression ratio for each of the second number of the storage units, and determining a second space savings based on the compression ratios and the deduplication ratio.

4. The method according to claim 3, wherein each of the duplication counts in the second histogram is associated with one or more of the logical data units, and comprising calculating, for each given deduplication count in the second histogram, an average of the compression ratios of the logical data units associated with the given deduplication count, weighting, for each of the deduplication counts in the second histogram, the respective observed frequency according to the respective average compression ratio, and weighting the third histogram based on the averages of the compression ratios.

5. The method according to claim 1, wherein the first histogram comprises multiple entries for a given calculated hash value, each of the multiple entries incorporating, for the logical data unit associated with each given calculated hash value, one or more properties selected from a first group consisting of a length type, a physical location, a virtual location and a timestamp, the length type selected from a second group consisting of a fixed length and a variable length.

6. The method according to claim 1, wherein identifying the third histogram that minimizes the target function comprises computing, on the second histogram, a calculation selected from a group consisting of a quadratic programming computation, a maximum likelihood computation and a linear programming computation.

7. The method according to claim 1, wherein the first histogram indicates duplication counts for a subset of the calculated hash values.

8. An apparatus, comprising:
    a storage device configured to store a dataset; and
    a processor configured:
        to randomly select, from a dataset partitioned into a first number of logical data units, a second number of logical data units determined by a sampling ratio, to be included in a sample group, to calculate respective hash values for each of the selected logical data units, to compute a first histogram indicating a duplication count of logical data units in the sample group, using the calculated hash values, to compute, based on respective frequencies of the calculated hash values, a second histogram indicating respective frequencies of the duplication counts in the first histogram, to derive a third histogram of predicted respective frequencies of duplication counts in the set of logical data units, by performing an optimization method, with a target function that minimizes a distance between the second histogram and the result of applying a sampling transformation with the specified sampling ratio on candidate third histograms, and to determine, based on the third histogram, a deduplication ratio for the dataset.

9. The apparatus according to claim 8, wherein the logical data units comprise first logical data units having a first length, and wherein the processor is configured to select the second number of the logical data units by selecting a third number of second logical data units from the dataset, the second logical data units having a second length greater than the first length, and extracting, from the second logical data units, the second number of the first logical data units.

10. The apparatus according to claim 8, wherein the deduplication ratio indicates a first space savings for implementing deduplication on the logical storage units, and wherein the processor is configured to estimate a compression ratio for each of the second number of the storage units, and to determine a second space savings based on the compression ratios and the deduplication ratio.

11. The apparatus according to claim 10 wherein each of the duplication counts in the second histogram is associated with one or more of the logical data units, and wherein the processor is configured to calculate, for each given duplication count in the second histogram, an average of the compression ratios of the logical data associated with the given deduplication count, to weight, for each of the deduplication counts in the second histogram, the respective observed frequency according to the respective average compression ratio, and to weight the third histogram based on the averages of the compression ratios.

12. The apparatus according to claim 8, wherein the first histogram comprises multiple entries for a given calculated hash value, each of the multiple entries incorporating, for the logical data unit associated with each given calculated hash value, one or more properties selected from a first group consisting of a length type, a physical location, a virtual location and a timestamp, the length type selected from a second group consisting of a fixed length and a variable length.

13. The apparatus according to claim 8, wherein the processor is configured to identify the third histogram that minimizes the target function by computing, on the second histogram, a calculation selected from a group consisting of a quadratic programming computation, a maximum likelihood computation and a linear programming computation.

14. The apparatus according to claim 8, wherein the first histogram indicates duplication counts for a subset of the calculated hash values.

15. A computer program product, the computer program product comprising:

a non-transitory computer readable storage medium having computer readable program code embodied therewith, the computer readable program code comprising:

computer readable program code configured to randomly select, from a dataset partitioned into a first number of logical data units, a second number of logical data units determined by a sampling ratio, to be included in a sample group;

computer readable program code configured to calculate respective hash values for each of the selected logical data units;

computer readable program code configured to compute a first histogram indicating a duplication count of logical data units in the sample group, using the calculated hash values;

computer readable program code configured to compute, based on respective frequencies of the calculated hash values, a second histogram indicating respective frequencies of the duplication counts in the first histogram;

computer readable program code configured to derive a third histogram of predicted respective frequencies of duplication counts in the set of logical data units, by performing an optimization method, with a target function that minimizes a distance between the second histogram and the result of applying a sampling transformation with the specified sampling ratio on candidate third histograms;
and computer readable program code configured to determine, based on the third histogram, a deduplication ratio for the dataset.

16. The computer program product according to claim 15, wherein the logical data units comprise first logical data units having a first length, and wherein the computer readable program code is configured to select the second number of the logical data units by selecting a third number of second logical data units from the dataset, the second logical data units having a second length greater than the first length, and extracting, from the second logical data units, the second number of the first logical data units.

17. The computer program product according to claim 15, wherein the deduplication ratio indicates a first space savings for implementing deduplication on the logical storage units, and comprising computer readable program code configured to estimate a compression ratio for each of the second number of the storage units, and to determine a second space savings based on the compression ratios and the deduplication ratio.

18. The computer program product according to claim 17, wherein each of the duplication counts in the second histogram is associated with one or more of the logical data units, and comprising computer readable program code configured to calculate, for each given deduplication count in the second histogram, an average of the compression ratios of the logical data associated with the given deduplication count, to weight, for each of the first deduplication counts in the second histogram, the respective observed frequency according to the respective average compression ratio, to weight the third histogram based on the average of the compression ratios.

19. The computer program product according to claim 15, wherein the first histogram comprises multiple entries for a given calculated hash value, each of the multiple entries incorporating, for the logical data unit associated with each given calculated hash value, one or more properties selected from a first group consisting of a length type, a physical location, a virtual location and a timestamp, the length type selected from a second group consisting of a fixed length and a variable length.

20. The computer program product according to claim 15, wherein the computer readable program code is configured to identify the third histogram that minimizes the target function by computing, on the second histogram, a calculation selected from a group consisting of a quadratic programming computation, a maximum likelihood computation and a linear programming computation.

21. The method according to claim 1, and comprising deciding, based on the determined deduplication ratio, whether or not to perform deduplication on the dataset.

\* \* \* \* \*